United States Patent [19]

Keijzer et al.

[11] 3,954,257

[45] May 4, 1976

[54] SUSPENSION STRUT

[75] Inventors: Johan H. Keijzer, Hasselt; Louis J. Jossa, Sint-Truiden; Henri C. J. Vanhove, Gelmen, all of Belgium

[73] Assignee: Monroe Belgium N. V., Sint-Truiden, Belgium

[22] Filed: Aug. 30, 1974

[21] Appl. No.: 501,977

[52] U.S. Cl. .............................. 267/65 R; 267/64 R; 267/34
[51] Int. Cl.² .......................................... F16F 5/00
[58] Field of Search ................. 267/34, 65 R, 65 B, 267/64 R, 64 B, 8 R

[56] References Cited
UNITED STATES PATENTS

| | | | |
|---|---|---|---|
| 3,031,180 | 4/1962 | Sergay | 267/64 B |
| 3,149,829 | 9/1964 | Baum | 267/64 B |
| 3,157,396 | 11/1964 | Long, Jr. | 267/8 R |
| 3,181,852 | 5/1965 | Paller | 267/8 R |
| 3,353,813 | 11/1967 | Erdmann et al. | 267/34 |
| 3,372,919 | 3/1968 | Jackson | 267/65 B |
| 3,376,032 | 4/1968 | Schmid | 267/65 R |
| 3,603,575 | 10/1971 | Arlasky et al. | 267/34 |

*Primary Examiner*—James B. Marbert
*Attorney, Agent, or Firm*—Harness, Dickey & Pierce

[57] ABSTRACT

A leveling strut for use in a vehicle leveling system and including a shock absorber cartridge telescopically received within an elongated tubular housing, with the cartridge including a reciprocal piston and piston rod, attachment means for securing the piston rod to the sprung portion of the vehicle and the housing to the unsprung portion of the vehicle, retaining means releasably retaining the shock absorber cartridge within the housing whereby to permit convenient removal of the cartridge from the housing for purposes of repair, replacement and the like, means defining a variable volume fluid chamber including a flexible diaphragm member, and means for selectively communicating pressurized fluid to and from the chamber to effect expansion and contraction thereof.

20 Claims, 9 Drawing Figures

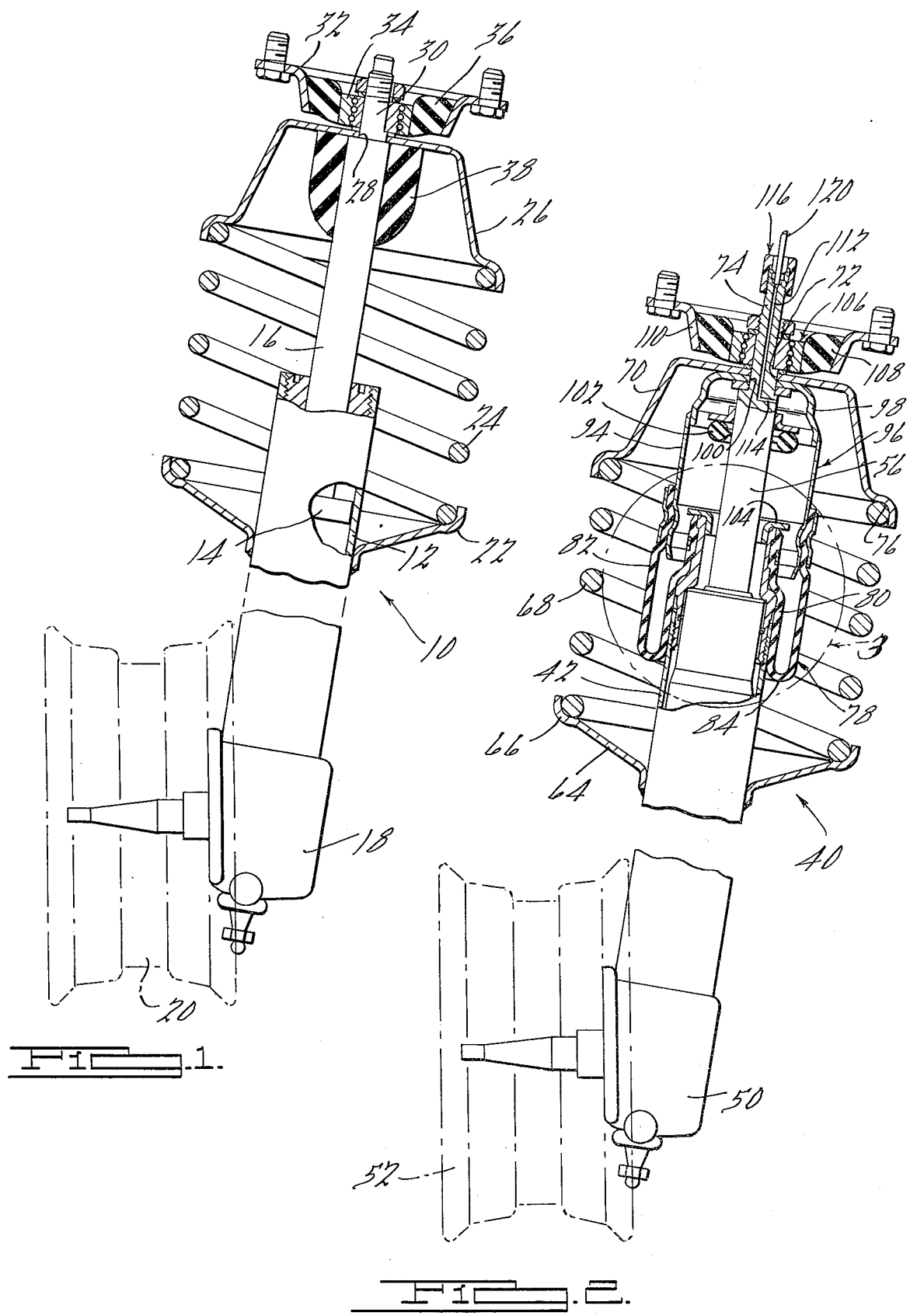

SUSPENSION STRUT

SUMMARY OF THE INVENTION

This invention relates generally to vehicle suspensions, and, more particularly, to a new and improved vehicle suspension including a leveling strut having a removable shock absorber cartridge incorporated therein, as well as a variable volume chamber which is adapted to be selectively pressurized to compensate for vehicle loading.

It is accordingly a general object of the present invention to provide a new and improved vehicle suspension strut.

It is a more particular object of the present invention to provide a new and improved suspension strut which incorporates a detachably mounted shock absorbing device that may be conveniently removed for purposes of repair, replacement and the like.

It is still another object of the present invention to provide a new and improved suspension strut of the above character which includes means in the form of a generally flexible tubular diaphragm member defining a variable volume gas chamber to which pressurized gas, such as compressed air, can be supplied in order to effect expansion and contraction of the chamber and thus compensate for vehicle loading.

It is a further object of the present invention to provide a new and improved suspension strut of the above-described type that will find universality of application by permitting the communication of pressurized gas to the chamber through various types and arrangements of fluid fitting means.

It is still another object of the present invention to provide a new and improved suspension strut of the above-described type which may be utilized on either front (steerable) or rear wheels of a vehicle.

It is yet another object of the present invention to provide a new and improved suspension strut of the above-described type which may incorporate a helical suspension spring in combination therewith.

It is still a further object of the present invention to provide a new and improved suspension strut which is of a relatively simple design, is economical to manufacture and will have a long and effective operational life.

Other objects and advantages of the present invention will become apparent from the following detailed description.

BRIEF DESCRIPTION OF THE DRAWINGS

FIG. 1 is a side elevational view, partly broken away, of a prior art type suspension strut;

FIG. 2 is a view similar to FIG. 1 of a suspension strut incorporating the principles of the present invention therein:

DESCRIPTION OF THE PREFERRED EMBODIMENTS

Figures 3, 8:
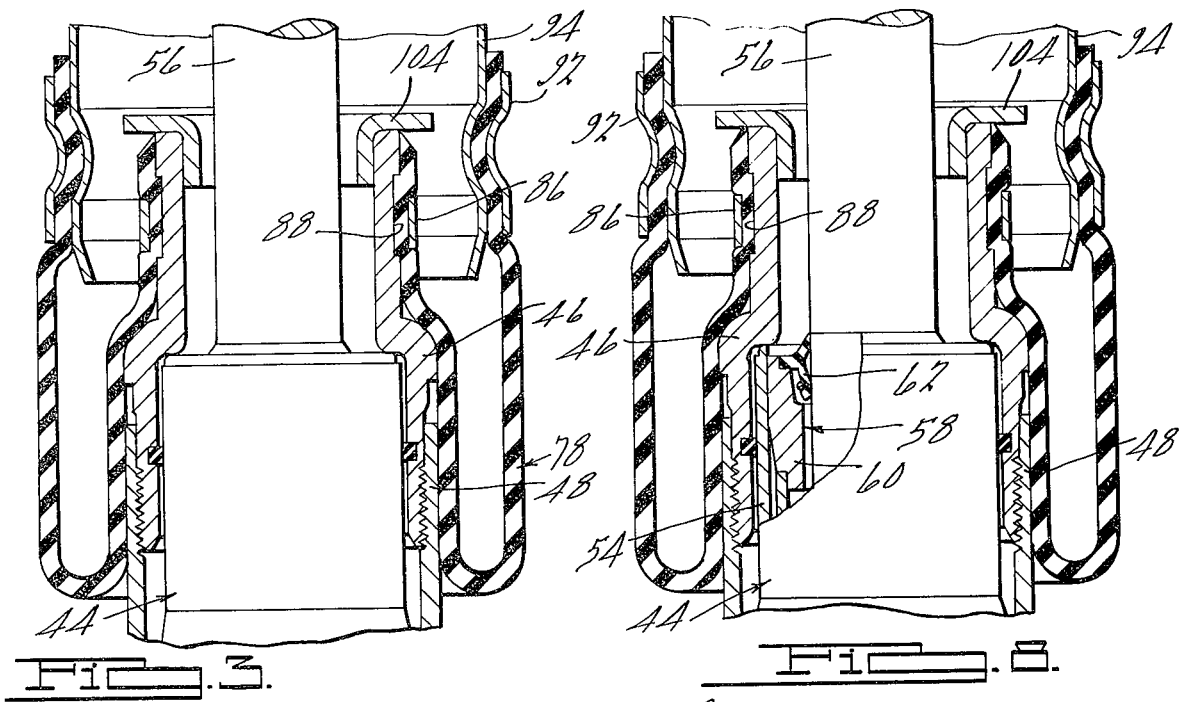
FIG. 3 is an enlarged cross-sectional view of the portion of the strut shown within the circle 3 of FIG. 2.
FIG. 8 is an enlarged fragmentary cross-sectional view of the structure shown in FIG. 3.

Referring now to FIG. 1 of the drawings, a prior art suspension strut of the independent-MacPherson type is generally designated by the numeral 10 and is shown as comprising a generally tubular cylindrical housing 12 within which a hydraulic damping piston 14 is reciprocally disposed. The piston 14 is operatively connected to the lower end of a piston rod 16 which extends upwardly from the upper end of the housing 12 and is reciprocable with the piston 14. The housing 12 is operatively mounted within or upon a wheel spindle or stub axle 18 which is adapted to operatively support an associated vehicle wheel or the like 20 in a manner well known in the art. Typically, suspension struts such as that shown in FIG. 1 are provided with a lower spring seat 22 that is fixedly secured to the outer periphery of the housing 12 and adapted to support the lower end of a helical coil spring 24 which extends generally coaxially of the housing 12. The upper end of the spring 24 is supported by an upper spring seat 26 which is formed with a central opening 28 through which the upper end 30 of the piston rod 16 extends. The piston rod upper end 30 is adapted to be operatively connected directly to an associated sprung portion of the vehicle or via a suitable connecting bracket or the like, representatively designated by the numeral 32, with the bracket 32 being provided with an anti-friction bearing assembly 34 adapted to rotatively connect the piston rod 16 to the vehicle and permit rotation of the suspension strut 10 as is necessary when the strut 10 is utilized on the front or steerable wheels of a vehicle. Typically, the bearing assembly 34 is mounted within a resilient material such as rubber or the like, as designated at 36, and a compression bumper 38 is provided between the underside of the upper spring seat 36 and the upper end of the housing 12.

While suspension struts such as that shown in FIG. 1 and designated by the numeral 10 have been found to be satisfactory for a large number of different types of vehicle applications, the leveling strut of the present invention is believed to materially improve the operation, effectiveness and ease of installation and removal for purposes of repair, replacement and the like, as compared with such prior art suspension designs. More particularly and as best shown in FIG. 2, a suspension strut 40, in accordance with one preferred embodiment of the present invention, is shown as comprising an elongated tubular or cylindrical housing 42 within which is located a removable shock absorber cartridge, generally designated 44, which is retained within the housing 42 by means of a threaded fitting 46. More particularly and as best seen in FIG. 3, the threaded fitting 46 is adapted to be threadably received within an internally threaded upper end 48 of the housing 42, whereby to permit convenient removal of the cartridge 44 for purposes of repair, replacement, etc. The lower end of the housing 42 is operatively supported upon a wheel spindle 50 which is adapted to operatively support the associated vehicle wheel 52 in the same manner as the aforementioned spindle 18.

The shock absorber cartridge 44 includes an elongated cylindrical enclosure 54 which is adapted to be telescopically received within the housing 42. Extending upwardly and reciprocal relative to the enclosure 54 is an elongated piston rod 56, the interior end of which is operatively connected to a suitable valved piston (not shown) which is cooperable with a quantity of damping fluid within the enclosure 54 for damping reciprocal movement of the rod 56. Disposed within the upper end of the enclosure 54 is a rod guide and seal assembly, generally designated by the numeral 58, which includes a rod guide 60 and a fluid seal 62 adapted to slidably and sealably engage the outer periphery of the rod 56 in a conventional manner.

For certain types of installations, it may be desirable to combine the associated vehicle suspension spring directly with the suspension strut 40 in much the same manner as is depicted in FIG. 1. Toward this end, the housing 42 is provided with a lower spring seat 64 which defines a generally radially disposed shoulder 66 adapted for engagement and support of a lower end of a helical coil spring 68 arranged concentrically of the housing 42. The upper end of the spring 68 is supported by a generally inverted cup-shaped upper spring seat 70 formed with a central opening 72 through which a reduced diameter portion 74 of the piston rod 56 extends. The upper spring seat 70 is formed with a downwardly directed shoulder 76 which is engaged by the upper end of the spring 68, as illustrated.

In accordance with the present invention, the suspension strut 40 is provided with a rolling diaphragm member, generally designated by the numeral 78, which is fabricated, for example, of natural or synthetic rubber which may, if desired, be reinforced by a suitable fabric or the like. The diaphragm member 78 is of a generally tubular configuration and is shown in FIG. 2 as comprising an inner end portion 80 and an outer end portion 82, with the portions 80, 82 being connected by an integral reversely folded portion 84. As shown in FIG. 3, the inner end portion 80 is preferably fixedly secured by means of a clamping ring or the like 86 to a recessed area 88 on the fitting 46, with the lower end of the inner end portion 88 extending downwardly along and contiguously engaged with the outer periphery of the housing 42. The upper end of the outer end portion 82 of the diaphragm member 78 is fixedly secured by means of a clamping ring or the like 92 to a generally cylindrical section 94 of a dirt shield assembly 96 which is disposed above and arranged coaxially of the housing 42. The upper end of the cylindrical section 94 is fixedly secured as by welding or the like to a generally cup-shaped upper end section 98 of the dirt shield 96, the section 98 being formed with a central opening 100 through which the reduced diameter end portion 74 of the piston rod 56 extends. Means in the form of a suitable compression bumper 102 is disposed between the underside of the dirt shield assembly 96 and the upper end of the housing 42 and adapted for engagement with a suitable bumper seat 104 that is located adjacent the upper end of the fitting 46.

Figure 4:
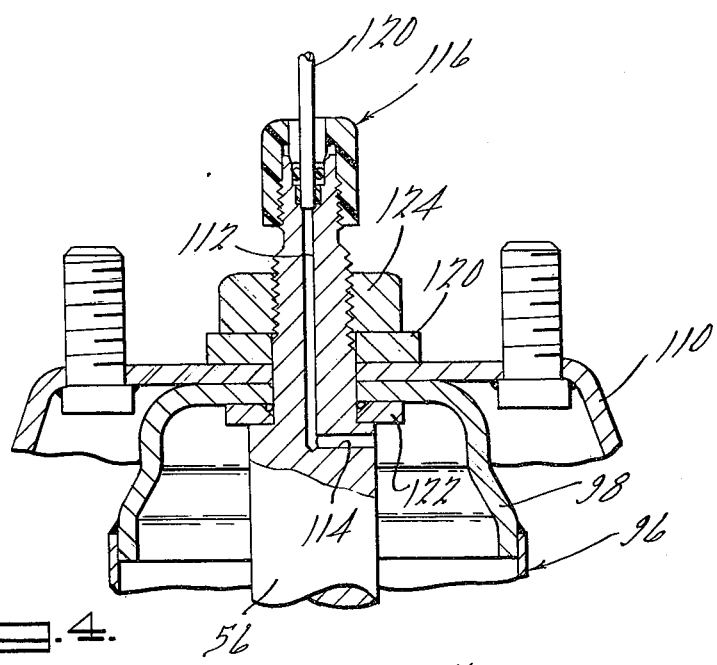
FIG. 4 is an enlarged fragmentary cross-sectional view of an alternate embodiment of the present invention.

The end portion 74 of the piston rod 56 is adapted to be rotatably supported, if desired, by means of a suitable anti-friction bearing assembly 106 which is mounted within a resilient cushioning element 108 located within an attachment bracket or chassis portion 110 whereby to fixedly secure the upper end of the suspension strut 40 to the associated chassis. As will be appreciated, the diaphragm member 78, along with the dirt shield assembly 96, forms a variable volume chamber which is adapted to be pressurized to compensate for vehicle loading and to supplement the action of the coil spring 68. Such pressurization of the variable volume chamber defined by the diaphragm member 78 and dirt shield assembly 96 may be accomplished in a number of satisfactory ways, for example, by forming a longitudinally extending bore 112 in the upper end portion 74 of the piston rod 56, which bore 112 is communicable with a cross bore 114 at the inner end thereof whereby to communicate with the interior of the aforesaid chamber. A suitable fitting assembly, representatively designated by the numeral 116, may be secured to the terminal end of the piston rod portion 74 for communicating a suitable fluid conduit 120 with the bore 112 and hence with the aforementioned chamber. A conduit 120 may be communicable with any suitable source of fluid pressure, such as a compressed gas provided, for example, by an air compressor on the associated vehicle. At such time as the aforesaid compressor is energized, compressed air will be supplied through the conduit 120, fitting assembly 116 and bores 112, 114 to the variable volume chamber to effect expansion thereof and thus compensate for vehicle loading. By virtue of the provision of the removable cartridge 44, at such time as the shock absorber therewithin becomes worn so as to require replacement, repair or the like, it is merely necessary to remove the fitting 46 and disconnect the piston rod 56 from the associated chassis and thereafter remove the cartridge 44 so that it may be repaired or be replaced with a similar cartridge having satisfactory operational characteristics. It is to be noted that the suspension strut 40 of the present invention will bind satisfactory application in vehicle suspensions wherein it is not necessary to provide for relative rotation between the strut and the associated chassis, such as when the strut would be utilized in a non-steerable (rear) wheel of a vehicle. As best seen in FIG. 4, in such an application, the upper end of the piston rod 56 could be secured between a pair of axially spaced washers or the like 120 and 122 and have a suitable threaded nut 124 secured thereon for retaining the piston rod 56 and dirt shield 96 in the respective operative relationship to the mounting bracket or chassis portion 110.

Figure 5:
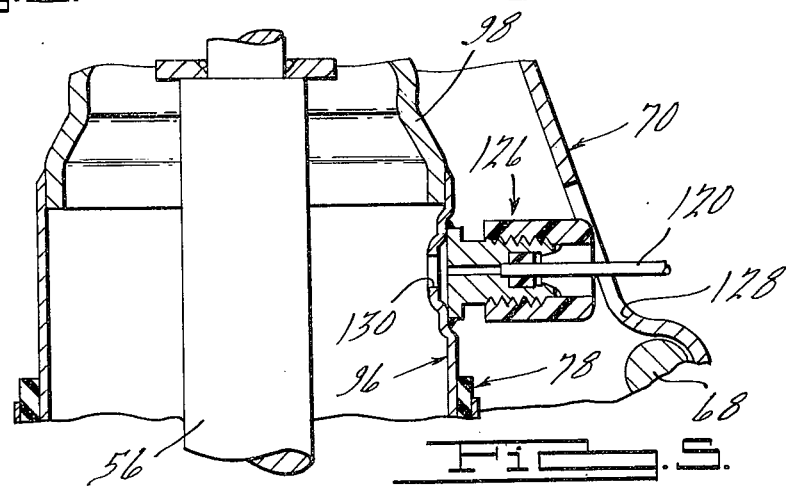
FIG. 5 is enlarged fragmentary view of still another embodiment of the present invention.
Figure 6:
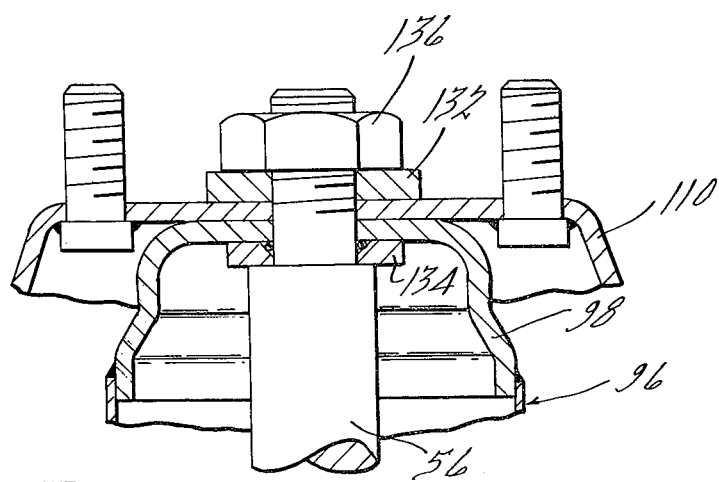
FIG. 6 is an enlarged fragmentary view similar to FIGS. 4 and 5 of still another embodiment of the present invention.

It is also noted that it may be desirable to operatively mount the suspension strut 40 of the present invention in certain locations wherein it is desirable to supply compressed air or some other pressurized fluid to the variable volume chamber defined by the dirt shield 96 and diaphragm 78 by some means other than through the piston rod 56. As best seen in FIG. 5, a suitable fluid fitting 126 may be fixedly secured to the dirt shield 96 for operatively connecting the conduit 120 thereto. In such an application, it is desirable to provide an access opening 128 in the side of the associated upper spring seat 70 to provide access to the fitting assembly 126. Of course, a suitable passage or port 130 should be provided in the dirt shield 96 so that pressurized fluid being communicated from the conduit 120 may be transmitted into the interior of the dirt shield 96. It will also be appreciated that in certain applications, the suspension spring 68 may not be necessary, as shown in FIG. 6, wherein the dirt shield 96 and piston rod 56 are secured directly to the associated mounting bracket or chassis portion 110 by means of a pair of washers or the like 132 and 134 and a suitable threaded nut 136 threadably received upon the upper end of the piston rod 56.

Figure 7:
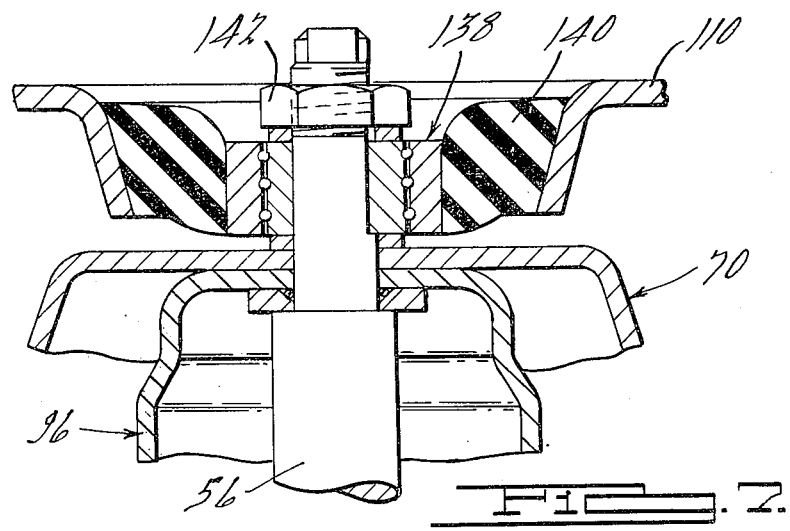
FIG. 7 is an enlarged fragmentary view of yet another embodiment of the present invention.

FIG. 7 illustrates another embodiment of the present invention wherein pressurized fluid is communicated to the aforementioned variable volume chamber defined by the diaphragm member 78 and dirt shield 96 through some means other than through the piston rod 56, with the piston 56 being rotatably connected to the associated chassis portion 110 so as to provide for relative rotation as would be required on a front wheel application as depicted in FIGS. 1 and 2. As shown in FIG. 7, the upper end of the piston rod 56 is rotatably connected by a suitable anti-friction bearing assembly 138 to the chassis portion 110 with a suitable damping or resilient media 140, with the piston rod 56 being secured by suitable nut or the like 142.

Figure 9:
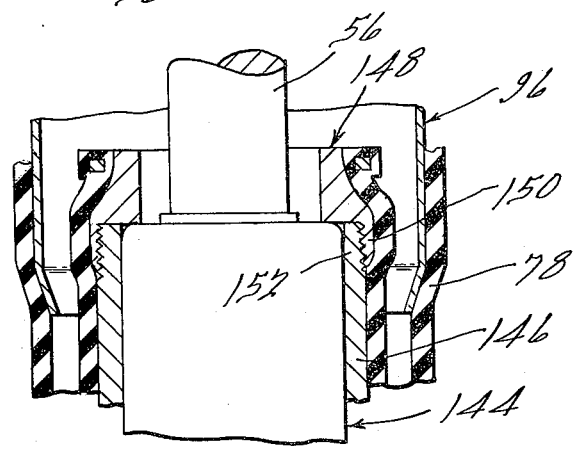
FIG. 9 is an enlarged fragmentary view of yet another embodiment of the present invention.

It will be appreciated, of course, that for certain types of applications, the fitting 46 retaining the cartridge 44 within the housing 42 need not necessarily be threadably engaged with the inner periphery of the upper end of the housing 42. A suitable alternative, for example, is shown in FIG. 9 wherein a shock absorber cartridge 144 is retained within a tubular housing 146 analogous to aforedescribed housing 42. The cartridge 144 is retained within the housing 146 by means of a suitable fitting or lock ring 148 having a lower internally threaded counterbored area 150 adapted to be threadably engaged with an upper externally threaded end portion 152 of the housing 146. Of course, various other alternatives are foreseen for operatively connecting the variable volume chamber defining diaphragm member 78 to the associated components of the suspension strut and/or operatively connecting the strut per se to the associated vehicle without departing from the scope or fair meaning of the present invention.

We claim:
1. A leveling system for a vehicle having sprung and unsprung portions and comprising;
   at least one leveling strut including a tubular housing,
   a shock absorber cartridge including a piston and cylinder assembly telescopically received in said housing, a reciprocal piston rod and
   attachment means securing said piston rod to one of the vehicle portions and said housing to the other of said vehicle portions,
   an annular retaining collar disposed adjacent the upper end of said housing and releasably secured thereto for removably retaining said shock absorber cartridge within said housing, with said collar being selectively disengageable from said housing to permit convenient axial withdrawal of said cartridge from said housing for purposes of repair, replacement and the like,
   a flexible diaphragm in part defining a variable volume fluid chamber,
   said diaphragm comprising radially spaced inner and outer parts connected by an integral reversely folded rolling part, said radially outer part being connected against movement relative to said piston rod, said rolling part being directly in contact with the outer surface of said housing, and said radially inner part being connected to said collar and removable from said housing therewith to permit withdrawal of said cartridge from said housing, and
   means for selectively communicating pressurized fluid to and from said chamber to effect expansion and contraction thereof.

2. The invention as set forth in claim 1 wherein said piston rod is rotatably connected to said one vehicle portion.

3. The invention as set forth in claim 1 wherein said piston rod is nonrotatably connected to said one vehicle portion.

4. The invention as set forth in claim 1 which includes fitting means for operatively connecting a fluid conduit to said chamber.

5. The invention as set forth in claim 4 wherein said fitting means is communicable with said piston rod and wherein said piston rod includes fluid passage means extending between said fitting means and said chamber.

6. The invention as set forth in claim 1 which includes an annular dirt shield arranged generally concentrically of said piston rod and cooperates with said diaphragm in defining said chamber.

7. The invention as set forth in claim 6 wherein said fitting means is operatively secured to said dirt shield.

8. The invention as set forth in claim 1 which includes a helical suspension spring arranged generally concentrically of said housing.

9. The invention as set forth in claim 8 which includes upper and lower spring seats for operatively supporting said helical coil spring, said lower spring seat being secured to said housing and said upper spring seat being secured to the vehicle portion associated with said piston rod.

10. The invention as set forth in claim 9 wherein said upper spring seat is formed with an access opening to provide access to a fitting communicating a source of fluid pressure with said chamber.

11. The invention as set forth in claim 1 wherein said wheel suspension is of the independent type.

12. The invention as set forth in claim 1 wherein said suspension strut is of the MacPherson type.

13. The invention as set forth in claim 11 which includes a wheel spindle secured adjacent the lower end of said housing for operatively connecting said strut with an associated vehicle wheel.

14. The invention as set forth in claim 6 wherein said dirt shield comprises a generally cylindrical section and a generally radially disposed section.

15. The invention as set forth in claim 14 wherein said radially outer part is operatively connected to said cylindrical section of said dirt shield.

16. The invention as set forth in claim 15 wherein said radially inner part of said diaphragm member extends around and is secured to the radially outer side of said collar.

17. The invention as set forth in claim 16 wherein said fitting means is threadably connected to the interior of the upper end of said housing.

18. The invention as set forth in claim 16 wherein said fitting means is threadably connected to a radially outer portion of the upper end of said housing.

19. The invention as set forth in claim 1 wherein said strut is communicable with a source of compressed air.

20. The invention as set forth in claim 19 which includes a fluid fitting communicable with said variable volume chamber and conduit means connecting said compressed air source with said fitting.

* * * * *